United States Patent
Andri (10) Patent No.: US 8,240,412 B2
(45) Date of Patent: Aug. 14, 2012

(54) PLUG-IN HYBRID ELECTRIC VEHICLE

(75) Inventor: Michael Jon Andri, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/423,047

(22) Filed: Mar. 16, 2012

(65) Prior Publication Data

US 2012/0178584 A1    Jul. 12, 2012

Related U.S. Application Data

(60) Division of application No. 13/273,072, filed on Oct. 13, 2011, now Pat. No. 8,136,614, which is a division of application No. 12/469,264, filed on May 20, 2009, now Pat. No. 8,047,313, which is a continuation of application No. 12/163,627, filed on Jun. 27, 2008, now Pat. No. 7,980,342.

(51) Int. Cl.
    *B60W 10/06* (2006.01)
(52) U.S. Cl. ............... 180/65.28; 701/104; 123/478
(58) Field of Classification Search ............... 180/65.1, 180/65.21, 65.24, 65.265, 65.28; 903/905, 903/906, 907, 930; 701/102, 103, 104, 105, 701/114; 123/310, 436, 478, 480; 361/216; 702/22, 182
See application file for complete search history.

(56) References Cited

U.S. PATENT DOCUMENTS

| | | | | |
|---|---|---|---|---|
| 3,714,823 A | * | 2/1973 | Wilkens et al. | 73/114.52 |
| 3,724,481 A | * | 4/1973 | Schutzenauer | 137/101.25 |
| 5,537,982 A | * | 7/1996 | Milunas et al. | 123/492 |
| 5,786,640 A | * | 7/1998 | Sakai et al. | 290/17 |
| 5,878,727 A | * | 3/1999 | Huls | 123/520 |
| 6,109,225 A | * | 8/2000 | Ogita et al. | 123/90.15 |
| 6,321,735 B2 | * | 11/2001 | Grieve et al. | 123/674 |
| 6,336,063 B1 | * | 1/2002 | Lennevi | 701/22 |
| 6,474,148 B2 | * | 11/2002 | Takagi et al. | 73/114.39 |
| 6,653,002 B1 | * | 11/2003 | Parise | 429/7 |
| 6,704,638 B2 | * | 3/2004 | Livshiz et al. | 701/102 |
| 6,712,503 B2 | * | 3/2004 | Lin et al. | 374/45 |
| 6,817,342 B2 | * | 11/2004 | Schule | 123/486 |
| 6,935,311 B2 | * | 8/2005 | Visser et al. | 123/406.47 |
| 7,000,718 B2 | * | 2/2006 | Adachi et al. | 180/65.235 |
| 7,059,313 B2 | * | 6/2006 | Lippa | 123/685 |
| 7,128,057 B2 | * | 10/2006 | Wiese et al. | 123/494 |
| 7,161,258 B2 | * | 1/2007 | Kanai | 290/40 R |
| 7,165,447 B2 | * | 1/2007 | Miyahara et al. | 73/114.39 |
| 7,185,641 B2 | * | 3/2007 | Suzuki | 123/520 |
| 7,281,527 B1 | * | 10/2007 | Bryant | 123/564 |
| 7,331,335 B2 | * | 2/2008 | Okuda | 123/520 |
| 7,341,048 B2 | * | 3/2008 | Koyama et al. | 123/518 |
| 7,367,223 B2 | * | 5/2008 | Kettl et al. | 73/53.05 |
| 7,389,769 B2 | * | 6/2008 | Amano et al. | 123/520 |
| 7,506,639 B2 | * | 3/2009 | Saito | 123/520 |
| 7,523,747 B2 | * | 4/2009 | Gachik et al. | 123/525 |
| 7,565,900 B2 | * | 7/2009 | Sato et al. | 123/516 |
| 7,640,912 B2 | * | 1/2010 | Lewis et al. | 123/304 |

(Continued)

*Primary Examiner* — J. Allen Shriver, II
*Assistant Examiner* — Brodie Follman
(74) *Attorney, Agent, or Firm* — Julia Voutyras; Alleman Hall McCoy Russell & Tuttle LLP (57) ABSTRACT

A method of operating a hybrid vehicle propulsion system includes selectively operating the engine to consume fuel stored on-board the vehicle based on a residence time of the fuel stored on-board the vehicle and further based on a profile of ambient conditions over the residence time.

8 Claims, 8 Drawing Sheets

U.S. PATENT DOCUMENTS

| | | | |
|---|---|---|---|
| 7,640,914 B2 * | 1/2010 | Lewis et al. | 123/431 |
| 7,694,760 B2 * | 4/2010 | Leone et al. | 180/65.21 |
| 7,730,872 B2 * | 6/2010 | Leone et al. | 123/305 |
| 7,775,310 B2 * | 8/2010 | Andri | 180/65.28 |
| 7,805,238 B2 * | 9/2010 | Andri | 701/104 |
| 7,920,955 B2 * | 4/2011 | Bauer et al. | 701/103 |
| 7,980,342 B2 * | 7/2011 | Andri | 180/65.28 |
| 8,047,313 B2 * | 11/2011 | Andri | 180/65.265 |
| 8,136,614 B2 * | 3/2012 | Andri | 180/65.265 |
| 2004/0169489 A1 * | 9/2004 | Hobbs | 320/104 |
| 2005/0133013 A1 * | 6/2005 | Lippa | 123/685 |
| 2005/0240336 A1 * | 10/2005 | Reddy | 701/103 |
| 2006/0042605 A1 * | 3/2006 | Amano et al. | 123/520 |
| 2008/0167788 A1 * | 7/2008 | Tate et al. | 701/104 |
| 2008/0201058 A1 * | 8/2008 | Bryant | 701/103 |
| 2008/0208435 A1 * | 8/2008 | Bryant | 701/103 |
| 2008/0215296 A1 * | 9/2008 | Craemer et al. | 702/189 |
| 2008/0234915 A1 * | 9/2008 | Nomasa et al. | 701/102 |
| 2008/0306672 A1 * | 12/2008 | Bauer et al. | 701/102 |
| 2009/0038585 A1 * | 2/2009 | Andri | 123/406.3 |
| 2009/0038586 A1 * | 2/2009 | Andri | 123/406.34 |
| 2009/0071443 A1 * | 3/2009 | Miyake et al. | 123/446 |
| 2009/0139320 A1 * | 6/2009 | Bulgrien | 73/115.02 |
| 2009/0265081 A1 * | 10/2009 | Shibata et al. | 701/104 |
| 2009/0292443 A1 * | 11/2009 | Stein et al. | 701/103 |
| 2009/0321159 A1 * | 12/2009 | Andri | 180/65.25 |
| 2009/0321164 A1 * | 12/2009 | Andri | 180/65.265 |
| 2010/0088008 A1 * | 4/2010 | Tanaka et al. | 701/104 |
| 2010/0116245 A1 * | 5/2010 | Andri | 123/299 |
| 2010/0147263 A1 * | 6/2010 | Russell et al. | 123/310 |
| 2010/0162991 A1 * | 7/2010 | Ramappan et al. | 123/27 R |
| 2012/0029751 A1 * | 2/2012 | Andri | 701/22 |

* cited by examiner

PLUG-IN HYBRID ELECTRIC VEHICLE

CROSS REFERENCE TO RELATED APPLICATIONS

The present application is a divisional of U.S. patent application Ser. No. 13/273,072 filed Oct. 13, 2011, which is a divisional of U.S. patent application Ser. No. 12/469,264 filed May 20, 2009, which is now U.S. Pat. No. 8,047,313, which is a continuation of Ser. No. 12/163,627, filed Jun. 27, 2008, which is now U.S. Pat. No. 7,980,342, the entire contents of which are incorporated herein by reference for all purposes.

BACKGROUND AND SUMMARY

Hybrid electric vehicles can provide fuel efficiency improvements over non-hybrid propulsion systems. For example, an electric motor may be operated with electrical energy rather than fuel to supplement or at times entirely supplant operation of the engine. Plug-in hybrid electric vehicles may further increase fuel efficiency by receiving electrical energy from a power source that is external the vehicle rather than relying on generation of the electrical energy on-board the vehicle from the combustion of fuel by the engine. For example, plug-in hybrid electric vehicles have the potential to carry travel between destinations without operating the engine to consume fuel or to consume fuel at even lower rates than may be realized by non-plug-in hybrid electric vehicles.

The inventor herein has recognized several disadvantages with the above approach, particularly in the context of a plug-in hybrid electric vehicle. For example, where the vehicle is frequently operated within a range that does not exceed the electrical storage capacity of the vehicle propulsion system, the engine may not be operated for extended periods of time, and hence fuel stored on-board the vehicle may not be consumed by the engine. Indeed, this is a primary goal of the plug-in hybrid electric vehicle described above. However, where the fuel is not consumed at a sufficient rate, fuel degradation may occur or the degree of fuel degradation may increase as a residence time of the fuel stored on-board the vehicle increases.

Thus, if the vehicle is eventually operated in a manner that exceeds the range afforded by the electrical storage capacity of the vehicle, the engine may be again relied upon to maintain the propulsive capability of the vehicle. Yet, where the fuel is degraded or where degradation of the fuel increases, engine performance may be reduced or engine damage may occur. In some conditions, engine starting may not be achievable or may be difficult to perform as a result of fuel degradation, thereby potentially limiting the vehicle to the range of the electrical storage capacity.

As one approach, the above issues may be addressed by a method that includes producing a motor output by selectively operating the motor to consume electrical energy stored on-board the vehicle; producing an engine output by selectively operating the engine to consume fuel stored on-board the vehicle; and increasing consumption of the fuel by the engine relative to consumption of the electrical energy by the motor as a residence time of the fuel stored on-board the vehicle increases. In some embodiments, the residence time of the fuel stored on-board the vehicle can provide an indication of fuel degradation, enabling the duty cycle of the engine to be selectively increased to enforce a variety of suitable fuel use conditions, particularly in the context of a plug-in hybrid electric vehicle where fuel use may be reduced for extended periods of time even when the vehicle is frequently operated. In this way, fuel degradation may be reduced while enabling the vehicle propulsion system to take advantage of the increased range afforded by a plug-in hybrid electric vehicle.

DETAILED DESCRIPTION

Figure 1:
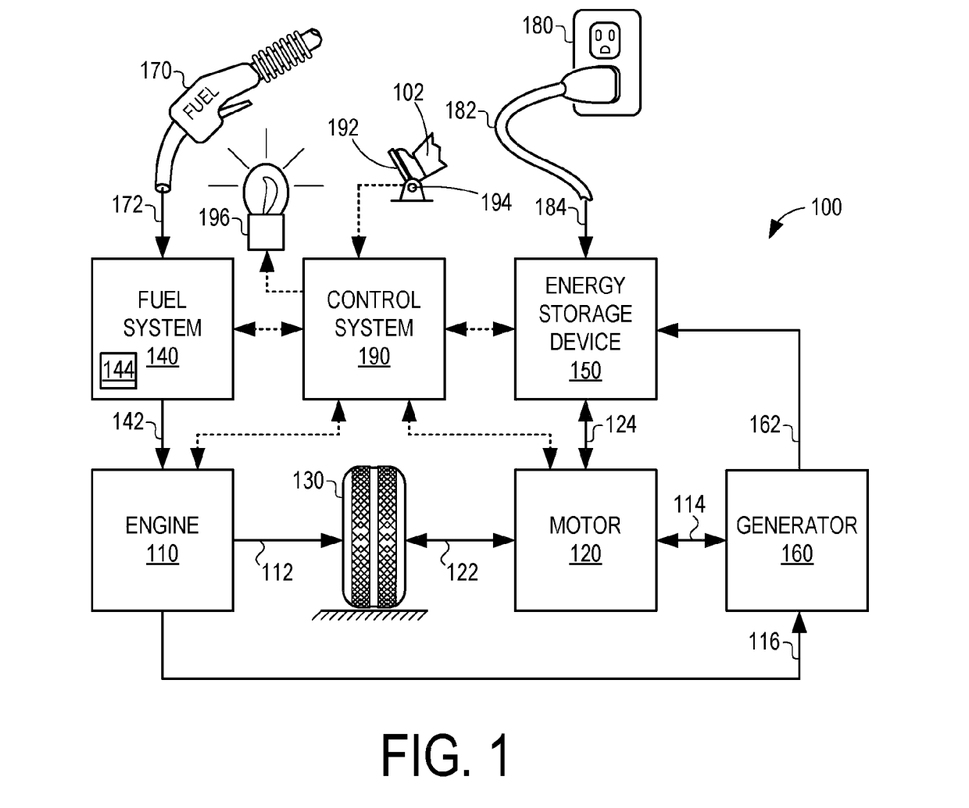
FIG. 1 illustrates an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, vehicle propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

As will be described with reference to the process flows of FIGS. 3 and 4, the vehicle propulsion system may be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3 and 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal or an accelerator pedal.

Energy storage device 150 may periodically receive electrical energy from a power source 180 residing external the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable may electrically couple energy storage device 150 and power source 180. While the vehicle propulsion system is operated to propel the vehicle, electrical transmission cable 182 may disconnected between power source 180 and energy storage device 150. Control system 190 may identify the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically received fuel from a fuel source residing external the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. When the level of fuel stored at fuel tank 144 (e.g. as identified by the fuel level sensor) may be communicated to the vehicle operator, for example, via a fuel gauge or indication lamp indicated at 196.

As described herein, engine 110 may be periodically set to a deactivated state where the consumption of fuel at the engine is significantly reduced or discontinued. Where engine 110 is deactivated for extended periods of time, the fuel stored at fuel tank 144 may take a longer time to be depleted by the engine. The period of time that the fuel remains in fuel tank 144 (or fuel system 140) may be referred to as the residence time of the fuel. As the residence time of the fuel increases, the quality of the fuel may decrease as a result of fuel degradation.

Fuel degradation may be caused by a variety of different factors. As one example, the lighter ends of the liquid fuel stored at fuel tank 144 may evaporate, thereby leaving behind the heavier ends of the liquid fuel, which may be less volatile than the original fuel. As residence time of the fuel increases, the fuel composition may change as a result of this evaporation. The less volatile fuel that remains may inhibit engine starting, degrade performance of the engine, or damage the engine under some conditions. Thus, if a vehicle operator relies on the engine to periodically supplement the motor propulsion or to generate electrical energy for use on-board the vehicle, the vehicle operator may be surprised to find that the engine is operating in a reduced capacity.

As another example of degradation, oxidation of the fuel may occur, which may result in the formation of deposits in the fuel. As residence time of the fuel increases, the concentration and/or size of these deposits may increase, which may increase the likelihood or severity of fuel system clogging and may damage or degrade the fuel system components, including the fuel pumps, fuel filters, fuel injectors, fuel passages, etc. Additionally, engine performance may be degraded or engine damage may occur from the increased presence of deposits in the fuel.

As yet another example, fuel separation or stratification may increase as residence time of the fuel increases. For example, a blended fuel including a hydrocarbon component and an alcohol component (e.g. E10 or E85) may separate over time into the respective hydrocarbon and alcohol components. As such, a fuel passage coupling fuel tank 144 to engine 110 may potentially convey to the engine a fuel having a different composition of the hydrocarbon component or alcohol component than the original fuel that was initially received via 172. The different fuel composition may cause the engine performance to be degraded or may cause engine damage.

As a further example, cyclical heating and cooling of the fuel stored on-board the vehicle (e.g. at fuel tank 144), which may be caused by heat generated by periodic use of the engine and/or diurnal heating caused by environmental temperature changes, may cause water vapor to condense into the liquid fuel. For example, water vapor that is present in the ullage space of fuel tank 144 during the higher day time temperatures may be condensed into the fuel when the temperature decreases to the lower night time temperatures. This addition of water to the fuel may cause reduced or degraded engine performance. Furthermore, the addition of water to some fuels may increase the rate of fuel separation or stratification of the fuel components. For example, an alcohol component may separate from a hydrocarbon component at a higher rate in the presence of water.

The above examples are merely non-limiting examples of how fuel may degrade as residence time of the fuel on-board the vehicle increases. It should be appreciated that fuel degradation may occur by other processes not explicitly recited above. Regardless of the particular manner by which fuel degradation occurs, the process flows of FIGS. 3 and 4 address the issue of fuel degradation in the context of a vehicle propulsion system that is configured as a plug-in hybrid electric vehicle. This plug-in hybrid electric vehicle, as described with reference to vehicle propulsion system 100, may be configured to utilize a secondary form of energy (e.g. electrical energy) that is periodically received from an energy source that is not otherwise part of the vehicle.

Figure 2:
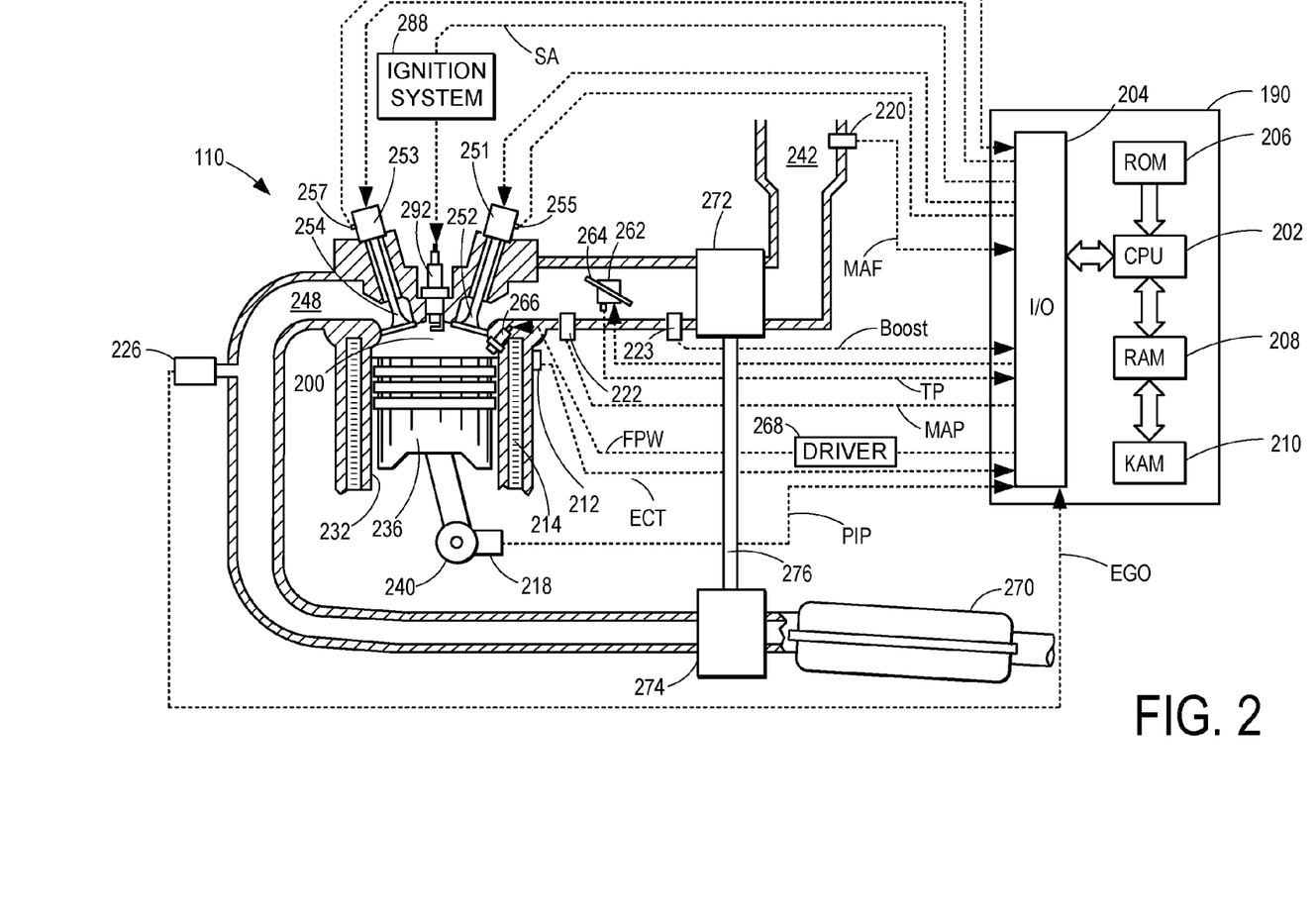
FIG. 2 illustrates an example internal combustion engine.

FIG. 2 illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a crank arm, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 253.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 230, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, and an indication of exhaust valve position via sensor 257, among others.

Furthermore, the control system may control operation of the engine 110, including cylinder 200 via one or more of the following actuators: driver 268 to vary fuel injection timing and quantity, ignition system 288 to vary spark timing, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

In some embodiments, engine 110 may include a boosting device such as turbocharger or supercharger than may include a compressor 272 and a turbine 174 communicating via shaft 276. Exhaust system 248 may include an exhaust aftertreatment system 270.

Figure 3:
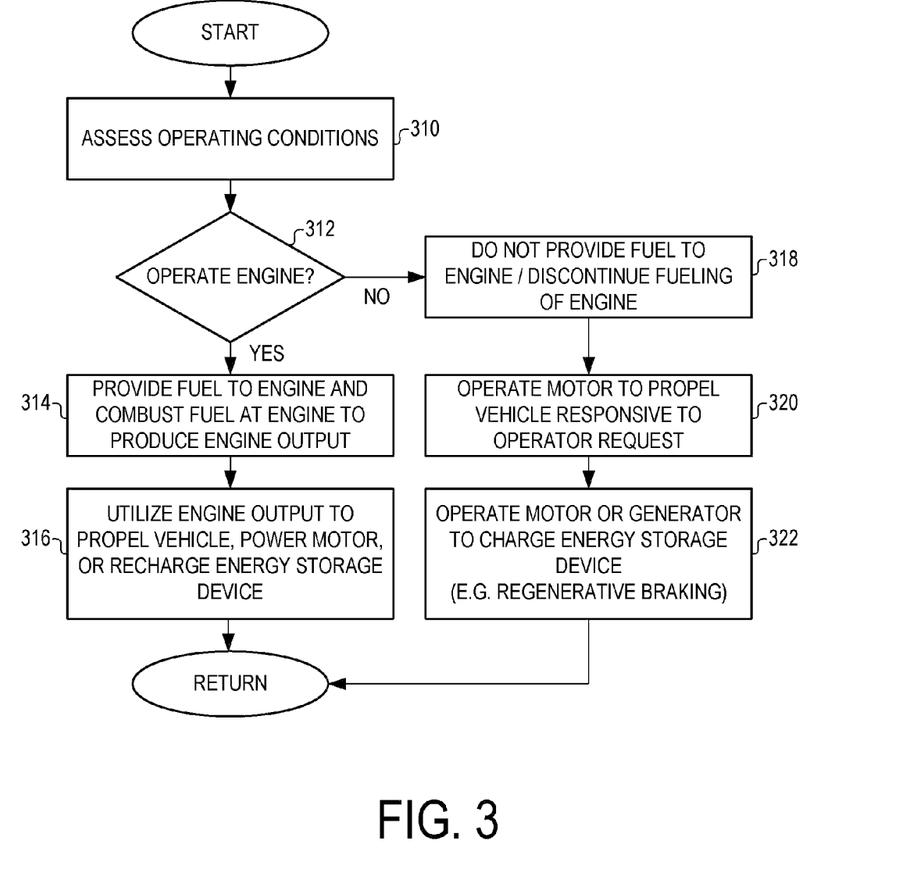
FIGS. 3 and 4 illustrate example process flows.

FIG. 3 illustrates an example process flow that may be performed to control the operation of a fuel burning engine, such as engine 110 of FIGS. 1 and 2. At 310, the operating conditions of the vehicle propulsion system may be assessed. For example, control system 190 may receive sensory feedback from one or more sensors associated with the vehicle propulsion system components as described above.

As a non-limiting example, these operating conditions may include one or more of the following: an indication of vehicle operator requested output from the vehicle propulsion system, an indication of fuel level or fuel amount at fuel tank 144, an indication of fuel usage rates by the engine, an indication of state of charge (SOC) of energy storage device 150, ambient conditions including humidity, temperature, etc. and others.

At 312, if the engine is to be operated, the process flow may proceed to 314. Alternatively, if the engine is not to be operated, the process flow may proceed to 318. For example, at 312, control system 190 may judged whether engine 110 is to be operated based on the operating conditions assessed at 310.

As a first example, the control system may judge whether a state of charge (SOC) of energy storage device 150 (e.g. the amount of energy stored at the energy storage device) is less than a first threshold value (i.e. minimum SOC threshold). If the SOC is judged to be less than the first threshold value, the control system may judge at 312 that the engine is to be operated, and the process flow may proceed to 314. Alternatively, if the SOC of the energy storage device is not less than the first threshold value, the control system may judge at 312 that the engine is not to be operated, and the process flow may proceed to 318.

As a second example, the control system may judge at 312 whether an operator requested torque for the vehicle propulsion system (e.g. as judged from the position of the accelerator pedal) is greater than a second threshold value (i.e. operator request threshold). If the operator requested torque is greater than the second threshold value, the control system may judge at 312 that the engine is to be operated, and the process flow may proceed to 314. Alternatively, if the operator requested torque is not greater than the second threshold value, the control system may judge at 312 that the engine is not to be operated, and the process flow may proceed to 318.

As a third example, the control system may judge whether a residence time of the fuel stored on-board the vehicle (e.g. at fuel tank 144) is greater than (i.e. has exceeded) a third threshold value (i.e. a residence time threshold). As will be described with reference to FIG. 4, the residence time threshold may be based on various fuel parameters, including fuel type, fuel level, and ambient conditions. If the residence time of the fuel is greater than the third threshold value, the control system may judge at 312 that the engine is to be operated to consume and combust at least some of the fuel, and the process flow may proceed to 314. Alternatively, if the residence time of the fuel is not greater than the third threshold value, the control system may judge at 312 that the engine is not to be operated, and the process flow may proceed to 318.

In some embodiments, the control system may utilize one or more of the above examples when judging at 312 whether the engine is to be operated to consume and combust fuel stored on-board the vehicle. For example, the control system may utilize the first example where SOC of the energy storage device is considered in conjunction with the third example where the residence time of the fuel is considered when evaluating whether the engine is to be operated. As another example, the control system may utilize the second example where operator requested torque is considered in conjunction with the third example where the residence time of the fuel is considered when evaluating whether the engine is to be operated. As yet another example, the control system may utilize the first, second, and third examples when evaluating whether the engine is to be operated.

In some embodiments, the control system may enforce a prescribed fuel usage rate condition relative to period of time, amount of electrical energy used by vehicle, a number of recharging events of the energy storage device, a vehicle mileage, etc. For example, the control system may control the engine to combust a prescribed amount of fuel at the engine within a prescribed time period (e.g. combust at least 5 gallons of fuel every month). As another example, the control system may control the engine to combust a prescribed amount of fuel at the engine for a given amount of electrical energy consumed by the motor (e.g. combust at least 1 gallon of fuel for every 10 kilowatt hours of electricity consumed by the motor). As yet another example, the control system may control the engine to combust a prescribed amount of fuel at the engine for a given number of recharging events of the energy storage device from an external power source (e.g. combust at least 10 gallons of fuel for every 10 plug-in recharging events). As still another example, the control system may control the engine to combust a prescribed amount of fuel at the engine for a given number of miles traveled by the vehicle (e.g. combust at least 1 gallon of fuel for every 100 miles traveled). These and other operating conditions may be used by the control system to enforce fuel usage rate conditions in accordance with the present disclosure. As described with reference to operation 312 of FIG. 3, the control system may utilize the decision whether to operate the engine as a way of enforcing any of the above described fuel usage rate conditions.

In still other embodiments, the control system may decide to operate the engine at 312 when the degree of degradation of the fuel stored on-board the vehicle exceeds a threshold degree of degradation. For example, where an engine speed profile during a previous engine start-up operation is utilized to identify the degree of degradation of the fuel, the control system may judge that the answer at 312 is yes when the engine speed profile deviates by a prescribed amount from an expected engine speed profile (indicating degraded fuel). Similarly, where exhaust gas composition is used to identify the degree of degradation of the fuel, a deviation of the exhaust composition from an expected exhaust gas composition by more than a prescribed amount may cause the control system to judge the answer at 312 to be yes. As yet another example, where the control system utilizes feedback from a fuel degradation sensor (e.g. within the fuel tank or along a fuel passage of the fuel system) to identify the degree of degradation, the control system may judge that the answer at 312 is yes when the degree of degradation exceeds a threshold.

At 314, fuel may be provided to the engine (e.g. via fuel injection) where the fuel may be combusted at the engine to produce an engine output (e.g. shaft work). At 316, the engine output may be utilized by the vehicle propulsion system to do one or more of the following: propel the vehicle (e.g. via drive wheel 130 as indicated by arrow 112), power motor 120 (e.g. as indicated by arrow 114) via generator 160 (e.g. as indicated by arrow 116) where the motor may in turn propel the vehicle (e.g. via drive wheel 130 as indicated by arrow 122). In this way, at least some of the fuel stored on-board the vehicle may be used to offset use of the secondary energy supply (e.g. electrical energy) that would otherwise be used to power motor 120.

By contrast, at 318, the control system does not provide fuel to the engine (e.g. fuel injection may be discontinued), thereby discontinuing fueling of the engine. Note that where the engine is currently not operating, the control system may maintain the engine in the deactivated state. In other words, the operation at 318 may entail no action by the control system in some examples. At 320, the motor may be operated to propel the vehicle responsive to the operator requested torque. At 322, motor 120 and/or generator 160 may be operated to charge the energy storage device. For example, the motor or generator (if included) may be operated to perform a regenerative braking operation whereby the motor or generator are operated to absorb kinetic energy of the drive wheels and convert the kinetic energy to a form that is storable by energy storage device 150. The operation at 322 may be performed in accordance with an operator brake request, for example. From 316 and 322, the process flow may return to the start.

Figure 4:
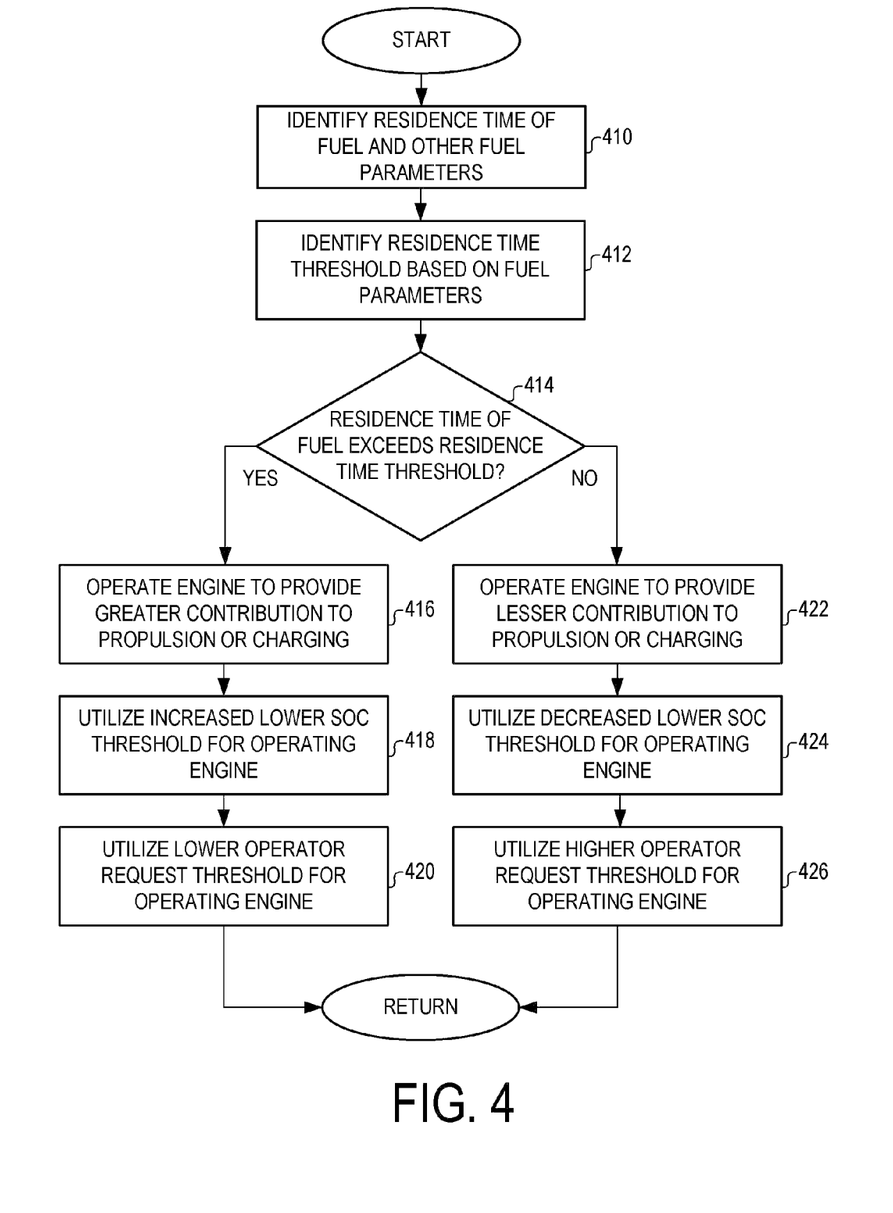

FIG. 4 illustrates an example process flow that may be performed to control operation of engine 110 of FIG. 1, in accordance with the process flow of FIG. 3. For example, at 410, the residence time of the fuel stored on-board the vehicle may be identified. As previously described, the residence time of the fuel stored on-board the vehicle may provide an indication of the degraded state or degree of degradation of the fuel. As a non-limiting example, the control system may initiate a counter or timer from a refueling operation of fuel system 140 from an external fuel source as indicated by arrow 172.

Furthermore, at 410, other fuel parameters of the fuel stored on-board the vehicle may be identified. In some embodiments, the control system may identify the composition of the fuel stored at fuel tank 144 via a fuel composition sensor. In some embodiments, the control system may utilize feedback from an exhaust gas composition sensor to infer the composition of the fuel that is delivered to the engine from fuel tank 144 by fuel system 140 based on a known fuel injection amount and a known air charge. In some embodiments, the control system may utilize feedback from engine output to infer the composition of the fuel that is delivered to the engine from fuel tank 144. As a non-limiting example, the control system may examine engine torque and/or engine speed at start-up of the engine to identify fuel composition or to identify the degraded state of the fuel (e.g. degree of degradation). For example, the engine speed curve during a first number of combustion events at start-up can provide an indication of the fuel composition and degree of degradation to the control system, where a lower engine speed (for a given fuel injection amount) may indicate a lower volatility fuel or a higher degree of degradation while a higher engine speed (for the given fuel injection amount) may indicate a higher volatility fuel or a lower degree of degradation.

Furthermore, in some embodiments, the control system may adjust the residence time of the fuel to account for the addition of new fuel to the fuel system, such as when the fuel system is refueled from an external fuel source (e.g. as indicated by arrow 172). As a first example, the control system may reset the residence time to zero (0) or may update the residence time to some other suitable value when a refueling operation is performed. In some embodiments, a refueling operation may be identified by the control system by a sensor that identifies the presence or insertion of fuel dispensing device 170 at a refueling nozzle of fuel system 140, or the control system may identify that a refueling operation has occurred responsive to an increase of the fuel level (e.g. as detected from the fuel level sensor) at fuel tank 144.

As a second example, the control system may reset the residence time to zero (0) or may update the residence time to some other suitable value when a refueling operation is performed that supplies at least a threshold amount of fuel to fuel tank 144. This threshold amount of fuel may be based on the amount or level of fuel stored at fuel tank 144 before the refueling operation is initiated. As a non-limiting example, the residence time may be reset to zero (0) or may be otherwise reduced when the fuel tank receives a 50% increase in fuel from refueling operation as measured from the level or amount of fuel stored at the fuel tank before the refueling operation was performed. Note that other suitable relative amounts may be considered by the control system for updating the residence time.

The residence time may be updated to a non-zero value that is greater than zero (0) responsive to a refueling operation in accordance with one or more fuel parameters before and after the refueling operation. For example, the residence time may be updated in accordance with a comparison of the amount of fuel stored at the fuel tank before the refueling operation and the amount of fuel stored at the fuel tank after the refueling operation, which provides an indication of how much fuel was supplied to the fuel tank by the refueling operation.

As a non-limiting example, the updated residence time may be reduced as the amount of fuel supplied to fuel tank by the refueling operation increases relative to the amount of fuel that was present at the fuel tank before the refueling operation. For example, where the amount of fuel at the fuel tank is increased by 50% as a result of a refueling operation the residence time of the fuel may be updated to a first value and where the amount of fuel at the fuel tank is increased by 75% as a result of a refueling operation the residence time of the fuel may be updated to a second value that is less than the first value. In this way, the residence time may be updated by reducing the residence time by a greater extent as the amount of fuel supplied to the fuel tank by a refueling operation increases. A similar approach may be utilized with respect to resetting or updating some other indication of fuel degradation status.

At 412, a residence time threshold may be identified for the fuel stored on-board the vehicle based on the fuel parameters identified at 412. The residence time threshold may be influenced by the composition of the fuel, the current degree of degradation, rate of change of the degree degradation, fuel level or amount of fuel stored at fuel tank 144 which provides an indication of ullage space at fuel tank 144, ambient or fuel related conditions over the relevant residence time of the fuel, including one or more of a temperature profile over the relevant residence time of the fuel, a humidity profile over the relevant residence time of the fuel, and a barometric pressure over the relevant residence time of the fuel. The temperature, humidity, and pressure parameters may be measured from the ambient environment or may be measured within the fuel tank 144 where the fuel resides.

With regards to fuel composition, some fuel compositions may degrade more rapidly than other fuel compositions. For example, a hydrocarbon fuel may degrade at a different rate than an alcohol fuel. Similarly, blends of two or more fuels may degrade at different rates depending on the composition of the two or more fuels and their relative representation in blended fuel. For example, a blend of gasoline and ethanol may degrade at a different rate than a blend of gasoline and methanol. As another example, E10 may degrade at a different rate than E85, since gasoline and ethanol are present in different relative amounts. As such, the control system may vary the residence time threshold responsive to the fuel composition. In some embodiments, the control system may reference a look-up table, map, or suitable function stored in memory to identify how a particular fuel composition may influence the residence time threshold.

With regards to the degradation degree and rate of change of the degradation degree of the fuel, the control system may advance the residence time threshold (e.g. set the residence time threshold to an earlier time value) when the fuel (of a given composition) stored on-board the vehicle indicates a higher degree of degradation, and the control system may retard the residence time threshold (e.g. set the residence time threshold to a later time value) when the fuel (of the given composition) stored on-board the vehicle indicates a lower degree of degradation. For example, the control system may be configured to update the residence time responsive to engine performance during a previous start-up operation.

The control system may advance the residence time threshold (e.g. set the residence time threshold to an earlier time value) when a rate of change of the degree of degradation of the fuel (of a given composition) indicates a higher rate of change, and the control system may retard the residence time threshold (e.g. set the residence time threshold to a later time value) when the rate of change of the degree of degradation of the fuel (of the given composition) indicates a lower rate of change. As previously described with reference to operation 410, the degree of degradation of the fuel may be identified by feedback received from one or more of a fuel composition or fuel quality sensor, an exhaust gas composition sensor, and engine output or performance (e.g. during start-up).

With regards to the fuel level or amount of fuel stored at the fuel tank, the control system may advance the residence time threshold (e.g. set the residence time threshold to an earlier time value) when the level of fuel or amount of fuel stored at the fuel tank is lower, and the control system may retard the residence time threshold (e.g. set the residence time threshold to a later time value) when the level of the fuel or the amount of the fuel stored at the fuel tank is greater. For example, the rate of fuel degradation may increase in some conditions as the ullage space of the fuel tank increases, since the evaporation rate of the fuel, the oxidation rate of the fuel, and the condensation of water vapor into the fuel may increase with increasing ullage space, which is inversely proportional to the amount of the fuel stored at the fuel tank.

With regards to the temperature profile, in some embodiments, the control system may advance the residence time threshold (e.g. set the residence time threshold to an earlier time value) when the temperature profile during the residence time of the fuel indicates a larger temperature variation between high and low temperatures, and the control system may retard the residence time threshold (e.g. set the residence time threshold to a later time value) when the temperature profile during the residence time of the fuel indicates a smaller temperature variation between high and low temperatures. For example, larger temperature variations can cause increased condensation of water vapor into the fuel, thereby increasing the rate of fuel degradation.

In some embodiments, the control system may advance the residence time threshold (e.g. set the residence time threshold to an earlier time value) when the temperature profile during the residence time of the fuel indicates higher maximum temperature or higher average temperature, and the control system may retard the residence time threshold (e.g. set the residence time threshold to a later time value) when the temperature profile during the residence time of the fuel indicates a lower maximum temperature or a lower average temperature. For example, the fuel degradation rate may increase in proportion to temperature of the fuel or the air occupying the ullage space of the fuel tank as a result of increase fuel evaporation rates. The control system may consider other temperature conditions when identifying the residence time threshold, such as the lowest temperature. For example, some fuels may degrade more rapidly at lower temperatures.

With regards to the humidity profile, in some embodiments, the control system may adjust the residence time threshold responsive to the average humidity, maximum humidity, minimum humidity, or humidity range during the residence time of the fuel. For example, the control system may advance the residence time threshold with higher humidity and may retard the residence time threshold with lower humidity, since water vapor may condense into the fuel more at a higher rate at higher humidity than at lower humidity.

With regards to the pressure profile, in some embodiments, the control system may adjust the residence time threshold responsive to barometric pressure or in-tank pressure (e.g. at the ullage space) during the residence time of the fuel. For example, the rate of fuel degradation may vary in response to the barometric pressure or the pressure within the fuel tank. It should be appreciated that control system may receive sensor feedback from one or more sensors associated with the operating conditions described above.

As such, at 412, a residence time threshold may be identified responsive to one or more of the fuel parameters described above. At 414, if the residence time exceeds the residence time threshold, the process flow may proceed to 416. Alternatively, if the residence time does not exceed the residence time threshold, the process flow may proceed to 422. For example, the control system may compare the residence time to the residence time threshold on a continuous or periodic basis to determine whether the residence time of the fuel identified at 410 exceeds the residence time threshold identified at 412.

At 416, the engine may be operated to provide a greater contribution toward propulsion of the vehicle (e.g. either directly via the drive wheel or by powering the motor) or charging of the energy storage device as compared to the operation at 422. By contrast, at 422, the engine may be operated to provide a lesser contribution toward propulsion of the vehicle or charging of the energy storage device as compared to the operation at 416. As such, the engine may be operated to consume and combust the fuel stored on-board the vehicle at a higher rate (across a given drive cycle) when the fuel is more degraded than when it is less degraded. As one example, the engine may be operated with an increased duty cycle when the residence time of the fuel is greater and may be operated with a reduced duty cycle when the residence time of the fuel is less. The term duty cycle is used herein to describe the relative time that the engine is in an active state combusting fuel relative to a deactivated state. In this way, new fuel may be received at the fuel system sooner or more regularly from an external fuel source, thereby reducing the likelihood of degraded fuel affecting engine performance that may result from combustion of a more degraded fuel.

For example, at 418, an increased lower SOC threshold may be set by the control system for operating the engine in accordance with operation 312 of FIG. 3. As such, the engine may be operated to combust fuel for purposes of propelling the vehicle, powering the motor, or recharging the energy storage device when the energy storage device is at an increased lower SOC threshold as compared to operation 424. In this way, engine 110 may be operated with an increased duty cycle, may be operated more frequently, may be operated for longer durations, and/or may be operated more aggressively (e.g. to produce greater engine outputs), thereby consuming and combusting fuel at a higher rate. By contrast, at 424, a decreased lower SOC threshold may be set by the control system for operating the engine than the SOC threshold set at 418.

As another example, at 420, a lower operator request threshold may be set by the control system for operating the engine in accordance with operation 312 of FIG. 3. As such, the engine may be operated to combust fuel for purposes of propelling the vehicle, powering the motor, or recharging the energy storage device when the operator request is at a lower level as compared to operation 426. In this way, engine 110 may be operated at an increased duty cycle, may be operated more frequently, may be operated for longer durations, and/or may be operated more aggressively (e.g. to produce greater engine outputs), thereby consuming and combusting fuel at a higher rate. By contrast, at 426, a higher operator request threshold may be set by the control system for operating the engine than the operator request threshold set at 420.

Figure 5A:
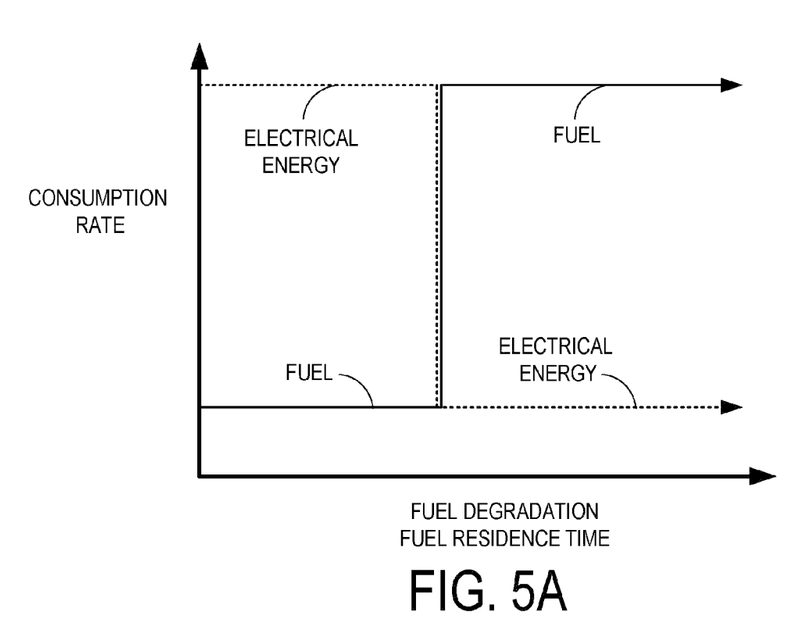
FIGS. 5A and 5B illustrate example graphs.
Figure 5B:
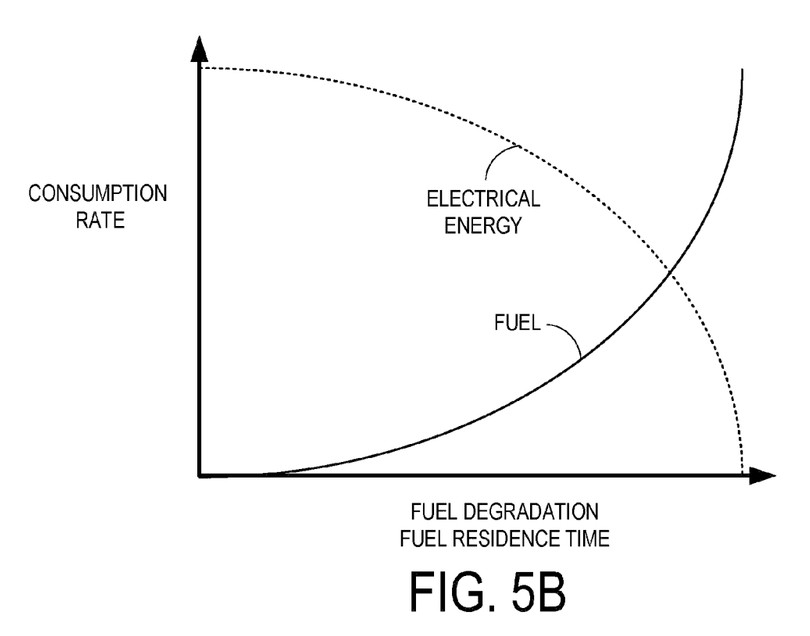

FIGS. 5A and 5B illustrate example graphs that depict how the consumption rate of fuel resources and electrical energy resources available on-board the vehicle may be varied by the control system responsive to fuel degradation and/or residence time of the fuel on-board the vehicle. Referring to FIG. 5A, at lower fuel degradation or fuel residence time, the consumption rate of the electrical energy by the motor may be greater than the consumption rate of the fuel by the engine. As the degree of fuel degradation or residence time of the fuel increases, the consumption rate of the fuel may increase relative to the consumption rate of the electrical energy. As illustrated in FIG. 5A, this may include a step-wise increase in consumption of the fuel and a step-wise decrease in consumption of the electrical energy.

FIG. 5B illustrates how the consumption rate of the fuel may be increased continuously in some embodiments relative to the consumption rate of the electrical energy as the fuel degradation or fuel residence time increases. The graphs of FIGS. 5A and 5B may represent control maps or functions that may be utilized by the control system to control fuel consumption of the fuel and electrical energy resources. It should be appreciated that the graphs depicted in FIGS. 5A and 5B are non-limiting examples, and that any suitable map or function may be used by the control system to control the consumption rates.

Figure 6:
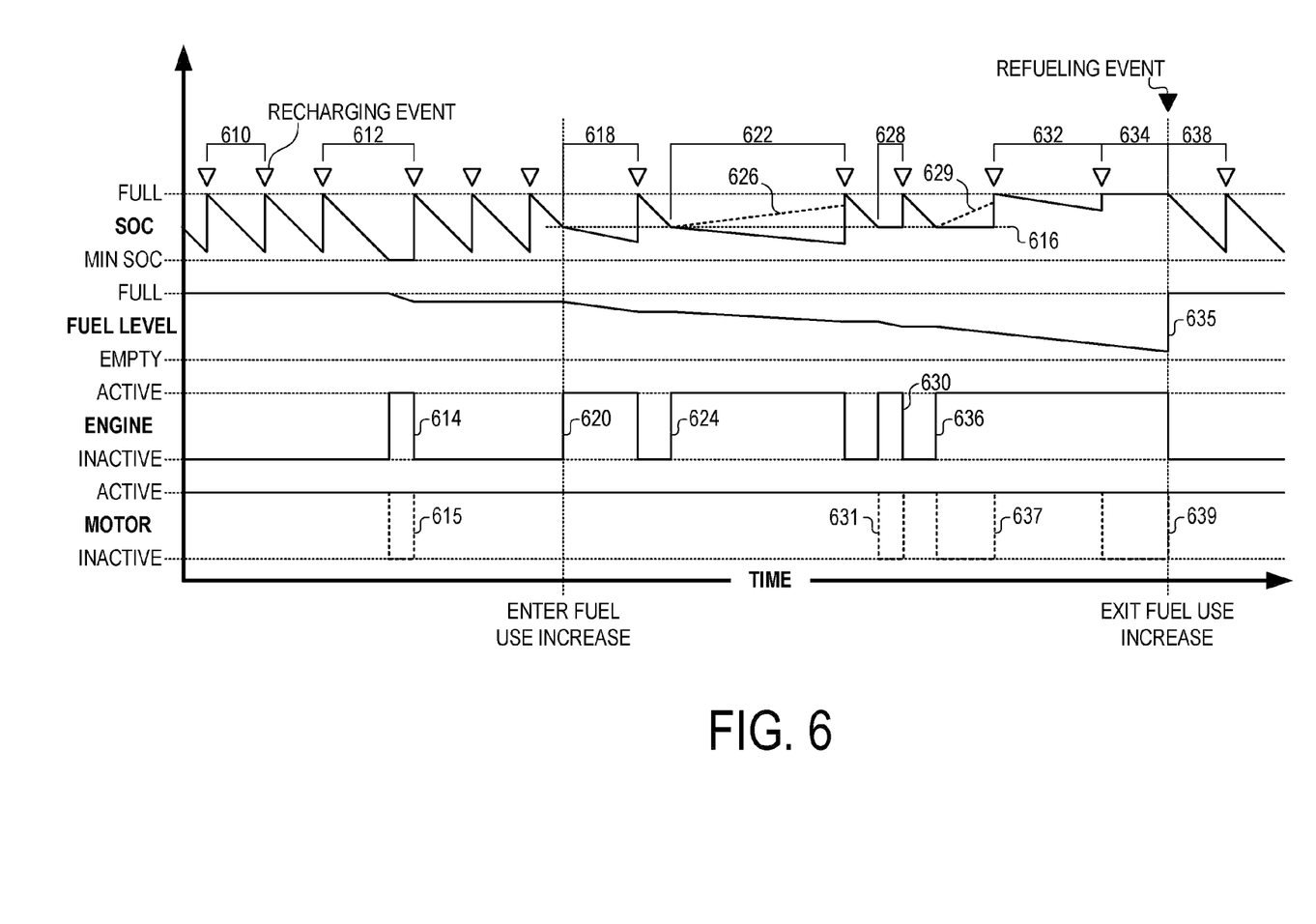
FIGS. 6-8 illustrate example timelines.

FIG. 6 illustrates a timeline depicting some of the operations that may be performed by the vehicle propulsion system across multiple drive cycles in accordance with the process flows of FIGS. 3 and 4. The timeline depicts how the state of charge (SOC) of the energy storage device, the fuel level (i.e. amount of fuel) at the fuel tank, engine operation, and motor operation may vary with time. The SOC and the fuel level represent the energy resources that are available on-board the vehicle and the motor and engine operations represent how those resources may be used to propel the vehicle.

The SOC is depicted with reference to a maximum SOC threshold (MAX SOC) and a minimum SOC threshold (MIN SOC). The MAX SOC may correspond to a full state of the energy storage device and the MIN SOC may correspond to an empty state or a minimum SOC that the motor can draw from the energy storage device before engine operation is initiated. The fuel level is depicted with reference to a full level and an empty level.

The engine operation is depicted with reference to an active and an inactive (e.g. deactivated) state. When the engine is in the active state, the engine may be selectively operated to consume and combust fuel stored on-board the vehicle. When the engine is in the inactive state, fuel is not consumed or combusted at the engine. Similarly, with regards to the motor operation, the motor may be selectively operated to consume a secondary form of energy other than the fuel (e.g. electrical energy) when the motor is set to the active state. By contrast, the motor may be deactivated when set to the inactive state, whereby the supply of electrical energy to the motor may be discontinued.

Recharging events are periodically depicted along the timeline, whereby electrical energy is supplied to the energy storage device from an energy source that is external the vehicle, for example, as indicated by arrow 184 of FIG. 1. These recharging events are depicted periodically along the timeline by inverted white triangles, and cause corresponding increases to the SOC of the energy storage device. Each of these recharging events may represent a period of time when the vehicle propulsion system was stationary and coupled with the external power source to receive the electrical energy. The period of time for receiving the electrical energy from the external power source has been truncated in FIG. 6 for the purposes of illustration.

Over the period indicated at 610, the motor may be operated in the active state to propel the vehicle by consuming electrical energy from the energy storage device, thereby reducing the SOC over the same period. Over the period indicated at 612, the motor may be once again operated in the active state to propel the vehicle by consuming electrical energy from the energy storage device. The period of time indicated by 612 is longer than the period of time indicated by 610. As such, depending on the driving conditions encountered by the vehicle propulsion system, the SOC may be reduced to MIN SOC before a subsequent charging event may occur.

Upon reaching MIN SOC, the engine may be switched to the active state as indicated at 614, whereby the engine may be operated to produce an engine output by consuming and combusting fuel stored on-board the vehicle. The fuel level is shown to decrease in response to the engine operation performed at 614. In some embodiments, the engine output obtained from the operation at 614 may be used to power the motor and thereby offset the amount of electrical energy that would otherwise be consumed by the motor from the energy storage device. This approach may be used where the vehicle propulsion system is configured as a series hybrid electric vehicle, for example. In other embodiments, the engine output obtained from the operation at 614 may be used to propel the vehicle while the motor is switched to the inactive state as indicated at 615. This approach may be used where the vehicle propulsion system is configured as a parallel hybrid electric vehicle, for example. In other examples, the engine may be operated to supplement the motor's propulsive effort, where both the motor and the engine are simultaneously operated.

When the SOC is once again increased by energy received from an external power source via a recharging event, the engine may be switched to the inactive state where consumption of fuel is discontinued and the motor may be activated or continue operating by consuming electrical energy from the energy storage device.

As previously described with reference to FIG. 4, the control system may judge whether the residence time of the fuel has exceeded a residence time threshold. As indicated by the timeline of FIG. 6, the residence time of the fuel exceeds the residence time threshold as indicated by "ENTER FUEL USE INCREASE". Once the fuel use increase mode has been entered by the control system, one or more of operations 416, 418, and 420 of FIG. 4 may be performed to increase the usage rate of the fuel stored on-board the vehicle. For example, the duty cycle of the engine may be increased while the engine is operated in the fuel increase mode.

Referring again to FIG. 6, as indicated at 616, the lower SOC threshold may be increased by the control system as described with reference to 418 of FIG. 4. For example, as indicated at 618, once the SOC of the energy storage device reaches the increased MIN SOC, the engine may be activated at 620 to provide supplemental power to the motor. As the engine is operated to at least partially power the motor, the fuel consumption rate may increase and the usage rate of electrical energy may be reduced for a given drive cycle. For example, the slope of the SOC over the period indicated at 618 is less than the slope of the SOC over the period indicated at 610. Alternatively, the engine may be operated to propel the vehicle, thereby offsetting the motor output utilized for vehicle propulsion. In this way, the fuel stored on-board the vehicle may be utilized to at least partially offset the usage of the electrical energy from the energy storage device that was obtained from the previous recharge operation.

As the residence time of the fuel continues to exceed the residence time threshold by a greater extent, the fuel usage rate by the engine may be further increased for a given set of operating conditions. For example, over the period of time indicated at 622, the engine may be operated at 624 to offset the usage rate of the electrical energy from the energy storage device to a greater extent. The slope of the SOC over the period indicated at 622 is less than the slope of the SOC over the period indicated by 618 for a given set of operating conditions. As such, the fuel consumption rate may be further increased, for example, by utilizing a lower operator request threshold for operating the engine as described by operation 420 of FIG. 4, or the engine may provide a greater contribution of the propulsive effort as described by operation 416 of FIG. 4.

The broken line indicated at 626 illustrates how the engine may be optionally operated to charge the energy storage device in addition to powering the motor or propelling the vehicle. Thus, the engine may be operated to provide a greater contribution to propulsion of the vehicle and/or charging of the energy storage device in accordance with operation 416 of FIG. 4.

As the residence time of the fuel continues to exceed the residence time threshold by a greater extent, the engine may be operated to provide an even greater contribution to the propulsion of the vehicle or charging of the energy storage device. For example, as indicated at 628, the engine may be activated at 630 to power the motor to a greater extent by substantially fulfilling the power needs of the motor. In this way, the SOC may be maintained at the increased lower SOC threshold indicated at 616. In other embodiments, the engine may be operated to propel the vehicle, whereby the motor may be switched to an inactive state as indicated at 631. As indicated at 629, the engine may be operated at 636 to recharge the energy storage device in addition to propelling the vehicle or powering the motor. At 637, the motor may be optionally switched to the inactive state (e.g. where the vehicle propulsion system includes a parallel configuration).

As the residence time of the fuel continues to exceed the residence time threshold by an even greater extent, the engine may be operated to provide an even greater contribution to the propulsion of the vehicle or charging of the energy storage device. For example, the minimum SOC threshold may be increased to an even higher value than 616. As a non-limiting example, this even higher value may correspond to the MAX SOC. As indicated at 632, the engine may be operated at 636 to partially offset the energy consumption of the motor from the energy storage device. For an even greater increase in fuel usage rate, as indicated at 634, the engine may be operated at 636 to completely offset the energy consumption of the motor from the energy storage device. As indicated at 639, the motor may be optionally switched to the inactive state in the case of a parallel hybrid configuration. In this way, the fuel stored on-board the vehicle may be consumed by the engine at an even greater rate.

As indicated by the refueling event represented by an inverted black triangle and further by the "EXIT FUEL USE INCREASE", the control system may exit the fuel use increase mode responsive to a refueling event. The refueling event causes the fuel level to increase as indicated at 635. The refueling event may further cause the fuel residence time to be reset to zero (0) or updated to some other suitable value in accordance with the fuel type, amount of fuel supplied by the refueling event, and/or the degree of degradation of the previous fuel as described with reference to FIGS. 3 and 4. In other embodiments, the control system may remain in the fuel use increase mode, but may reduce the fuel usage rate to one of the previously described strategies employed at 618, 622, 626, 628, 629, 632, etc.

It should be appreciated that in some embodiments, the control system may utilize a plurality of different residence time thresholds that correspond to a different one of the strategies employed at 618, 622, 626, 628, 629, 632, and 634. As such, the process flow of FIG. 4 may be applied to any one of a plurality of different residence time thresholds identified by the control system.

Once the control system exits the fuel use increase mode or exits a fuel use increase mode of a particular residence time threshold, one or more of operations 422, 424, and 426 may be performed to reduce the usage rate of the fuel stored on-board the vehicle, thereby increasing the usage rate of the secondary energy supply (e.g. electrical energy) from the energy storage device. For example, as indicated at 638, the control system may increase the usage rate of the electrical energy by the motor from the energy storage device (e.g. as depicted by the more rapid decrease in SOC) relative to the fuel consumption rate of the engine.

Thus, FIG. 6 depicts how the control system may vary the relative rate at which two or more energy resources are used by the vehicle propulsion system responsive to the residence time of the fuel stored on-board the vehicle. As illustrated by FIGS. 3-6, as the residence time of the fuel increases, the amount of fuel consumed by the engine may be increased relative to the amount of electrical energy consumed by the motor from the energy storage device for a given set of operating conditions. Conversely, as the residence time of the fuel decreases by a reset or update resulting from a refueling operation, the amount of fuel consumed by the engine may be reduced relative to the amount of electrical energy consumed by the motor from the energy storage device for a given set of operating conditions. For example, as illustrated by the timeline of FIG. 6, as the fuel residence time increases, the usage rate of the fuel increases (e.g. as indicated by the increased slope of the fuel level) and the usage rate of the electrical energy from the energy storage device is reduced (e.g. as indicated by the decreasing slope of the SOC).

FIGS. 7 and 8 are timelines illustrating further examples of how the vehicle propulsion system may be controlled to vary the fuel usage rate responsive to fuel residence time or the degree of degradation of the fuel. In contrast to the timeline of FIG. 6, which illustrates operation of the vehicle propulsion system across a plurality of drive cycles, the timelines of FIGS. 7 and 8 illustrate the transitions between two or more different modes of operation during a particular drive cycle. For each of the timelines of FIGS. 7 and 8, the total output of the vehicle propulsion system (e.g. as measured at the drive wheel) is depicted along the vertical axis. For purposes of comparison, this total output may be the same for each of the timelines illustrated by FIGS. 7 and 8.

Figure 7A:
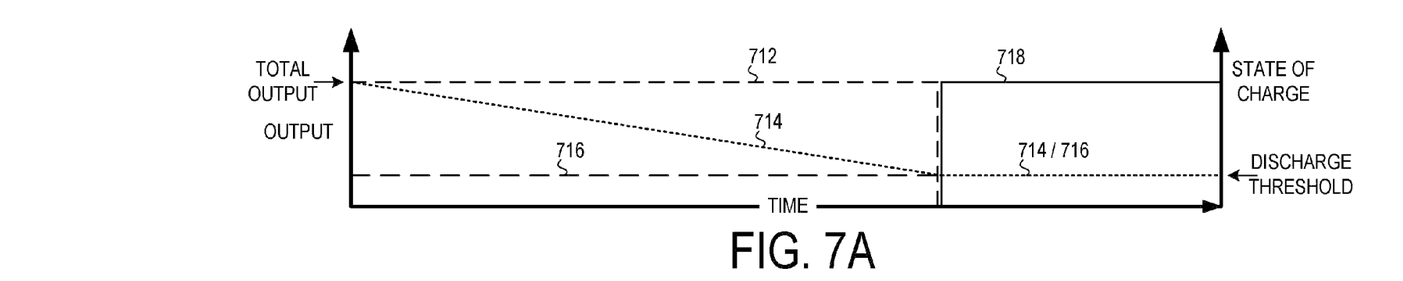

FIG. 7A illustrates a first timeline depicting an example transition that may be performed by the control system between two different modes of operation responsive to the SOC of the energy storage device. As indicated at 712, the vehicle propulsion system is initially being propelled by the motor. As such, the motor output indicated at 712 matches the total output requested by the vehicle operator as previously described at operation 320 of FIG. 3. As the state of charge (SOC) of the energy storage device indicated at 714 reaches the lower SOC threshold indicated at 716, operation of the motor may be discontinued (e.g. the motor operation may be set to the inactive state), whereby the engine is operated at 718 to produce an engine output that corresponds to the total output requested by the vehicle operator.

The operation illustrated by the timeline of FIG. 7A may be performed when the residence time of the fuel stored on-board the vehicle is shorter or where the fuel stored on-board the vehicle is less degraded (e.g. lower degree of degradation). By contrast, the operations illustrated by the timelines of FIGS. 7B and 7C may be performed when the residence time of the fuel stored on-board the vehicle is longer or where the fuel stored on-board the vehicle is more degraded (e.g. higher degree of degradation).

Figure 7B:
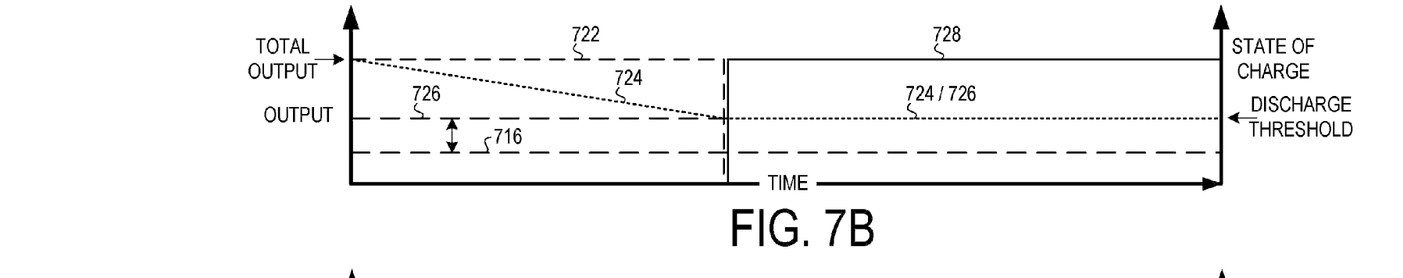

For example, referring to FIG. 7B, the lower SOC threshold may be increased from 716 to 726 in accordance with operation 418 of FIG. 4. Thus, where the vehicle is initially propelled by the motor as indicated at 722 and the SOC of the energy storage device 624 is reduced to the lower SOC threshold 726, the engine may be activated sooner as indicated at 728 relative to the activation of the engine at 718 of FIG. 7A. In this way, the fuel stored on-board the vehicle may be used sooner and/or more rapidly by the engine, thereby reducing the likelihood or severity of fuel degradation.

Figure 7C:
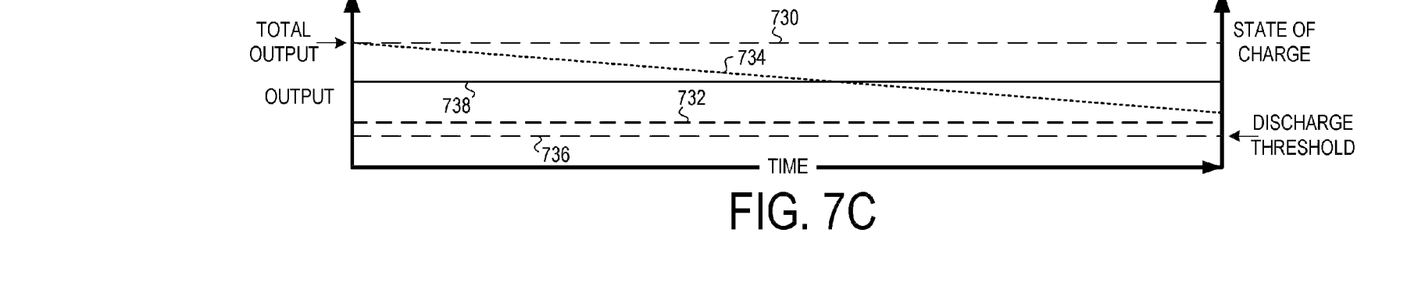

Referring to FIG. 7C, a lower operator request threshold for operating the engine may be set by the control system than at FIG. 7A as described by operation 420 of FIG. 4, or the engine may be operated to provide a greater contribution to the propulsion of the vehicle as described by operation 416 of FIG. 4. For example, the motor is operated at 732 to produce a lower output for propelling the vehicle relative to 712, whereby the engine may be operated at 738 to propel the vehicle by supplementing the propulsive effort provided by the motor. Thus, in FIG. 7C, the motor and engine each propel the vehicle to provide the total output 730 requested by the vehicle operator. By operating the engine to supplement the motor, the rate of discharge of the energy storage device is reduced as indicated at 734, while the rate of consumption of the fuel may be increased as compared to FIG. 7A. In this way, the engine may be operated to consume fuel and propel the vehicle even when the SOC of the energy storage device is greater than the lower SOC threshold indicated at 736.

The operations illustrated by the timelines of FIGS. 7A, 7B, and 7C may be performed by a vehicle propulsion system configured as a parallel type hybrid propulsion system. The operations illustrated by the timelines of FIGS. 8A, 8B, and 8C may be performed by a vehicle propulsion system configured as a series type hybrid electric vehicle. For example, in each of the examples illustrated by FIGS. 8A, 8B, and 8C, the motor propels the vehicle by providing the total output requested by the vehicle operator.

Figure 8A:
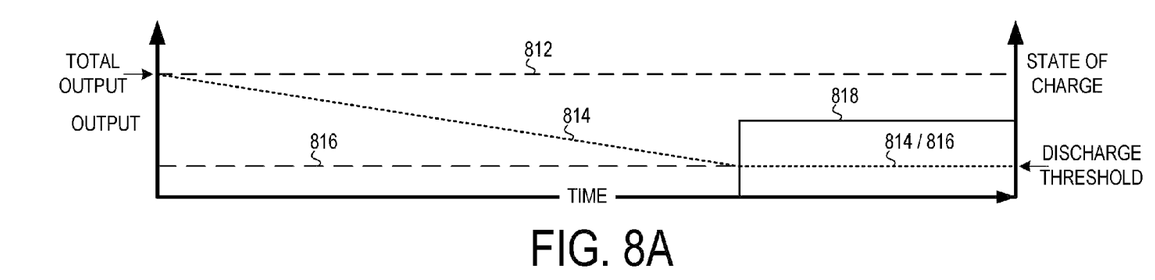

Referring to FIG. 8A, the motor output is indicated at 812. As the motor consumes electrical energy from the energy storage device, the SOC indicated at 814 is reduced until reaching the lower SOC threshold 816, whereby the engine is operated at 818 to at least partially offset the electrical energy consumed by the motor by generating electricity via generator 160. The operation illustrated by the timeline of FIG. 8A may be performed when the residence time of the fuel stored on-board the vehicle is shorter or where the fuel stored on-board the vehicle is less degraded (e.g. lower degree of degradation). By contrast, the operations illustrated by the timelines of FIGS. 8B and 8C may be performed when the residence time of the fuel stored on-board the vehicle is longer or where the fuel stored on-board the vehicle is more degraded (e.g. higher degree of degradation).

Figure 8B:
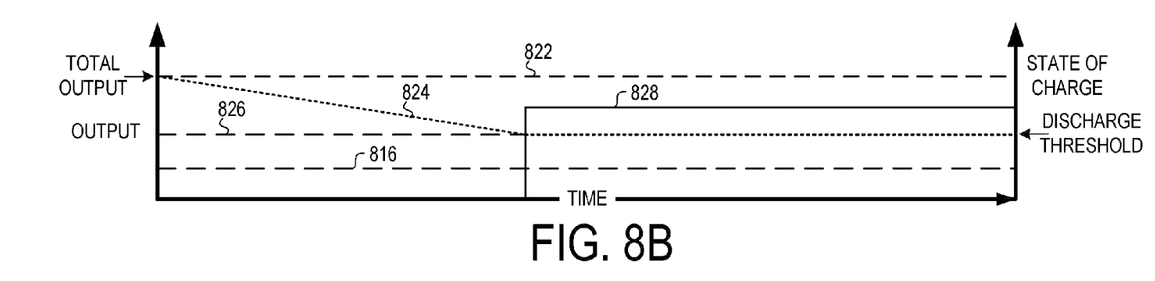

As shown in FIG. 8B, the motor output is indicated at 822. As the motor consumes electrical energy from the energy storage device, the SOC indicated at 824 is reduced until reaching the lower SOC threshold 826. The SOC threshold at 826 is higher than the SOC threshold at 816, thereby causing the engine to be activated at 828 at an earlier time than at 818. In this way, the fuel stored on-board the vehicle may be consumed sooner and/or at a higher rate by increasing the SOC threshold for activation of the engine.

Figure 8C:
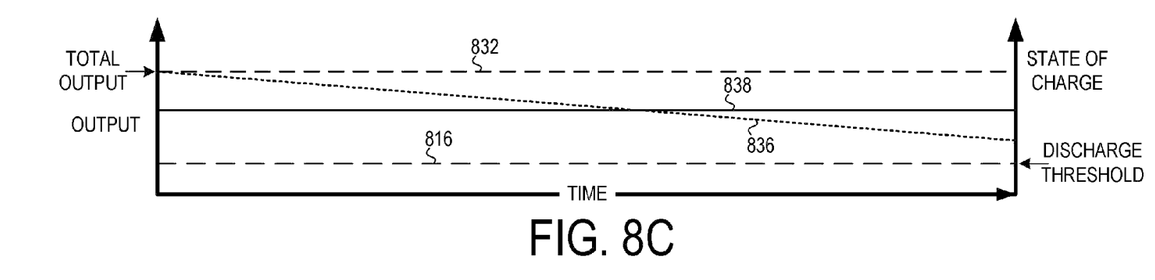

As shown in FIG. 8C, the motor output is indicated at 832. As the motor consumes electrical energy from the energy storage device, the SOC indicated at 836 is reduced at a slower rate as compared to FIG. 8A as a result of the operation of the engine at 838. As described with reference to operations 416 and 420 of FIG. 4, the engine may be operated to provide a greater proportion of propulsive effort by powering the motor or charging the electrical storage device, which may be effectuated by reducing operator request threshold for operating the engine. As such, the fuel stored on-board the vehicle may be consumed more rapidly or may be consumed sooner using the approach of FIG. 8C as compared to the approach of FIG. 8A.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle propulsion system including a motor and an engine, comprising:
   operating the motor and engine to consume electrical energy and fuel, respectively, to propel the vehicle; and
   increasing engine fuel consumption relative to motor electrical energy consumption based on residence time of fuel stored on-board the vehicle being greater than a threshold, the threshold adjusted based on an in-tank pressure of a fuel tank ullage space.

2. The method of claim 1 further comprising:
   periodically receiving electrical energy at an energy storage device of the vehicle from an energy source that is external to the vehicle.

3. The method of claim 2, where the threshold is further adjusted based on an average ambient humidity profile over the residence time, including advancing the threshold as the average ambient humidity increases.

4. The method of claim 3, where the threshold is further advanced based on a larger temperature variation between high and low temperatures of an ambient temperature profile.

5. The method of claim 4, where the threshold is further adjusted based on barometric pressure.

6. The method of claim 4, where increasing engine fuel consumption includes operating the engine to provide a greater contribution to the propulsion of the vehicle relative to the motor.

7. The method of claim 1, where the residence time of the fuel stored on-board the vehicle is adjusted based on refueling of the fuel tank.

8. The method of claim 7 wherein the engine is periodically deactivated while the vehicle operates.

* * * * *